W. F. COVINGTON.
SEED PLANTER.
APPLICATION FILED DEC. 19, 1911.

1,043,673.

Patented Nov. 5, 1912.
3 SHEETS—SHEET 1.

Witnesses

Inventor
William F. Covington
By Victor J. Evans
Attorney

Inventor
William F. Covington
By Victor J. Evans
Attorney

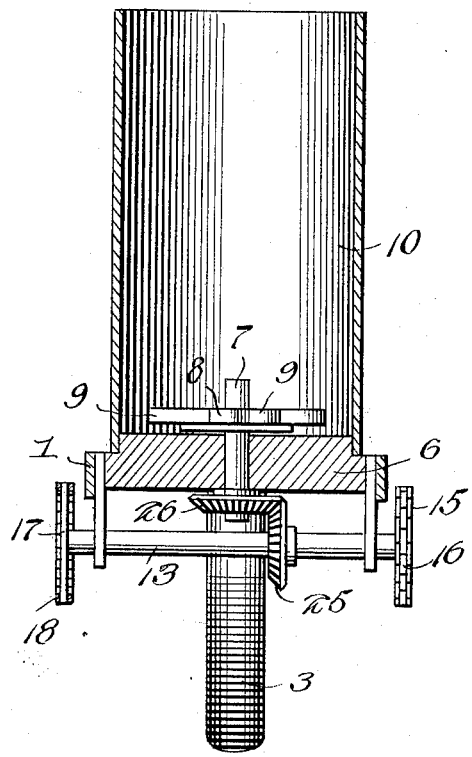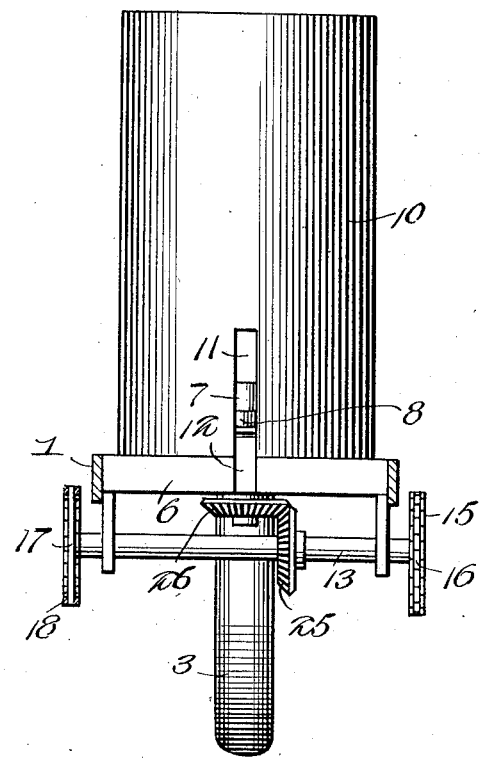

UNITED STATES PATENT OFFICE.

WILLIAM F. COVINGTON, OF HEADLAND, ALABAMA.

SEED-PLANTER.

1,043,673.   Specification of Letters Patent.   Patented Nov. 5, 1912.

Application filed December 19, 1911. Serial No. 666,744.

*To all whom it may concern:*

Be it known that I, WILLIAM F. COVINGTON, a citizen of the United States, residing at Headland, in the county of Henry and State of Alabama, have invented new and useful Improvements in Seed-Planters, of which the following is a specification.

This invention relates to seed planters and particularly to devices for planting cotton seed.

Heretofore, in planting cotton seed the same has usually been planted in drills by mechanism which has been calculated to plant the seed in a straight row. After the plants begin to sprout, it has been necessary to chop out the superfluous plants in order to leave stands at suitable distances apart. These methods have been wasteful not only in requiring a large quantity of seed to be uselessly planted, but also in involving a great deal of hard labor in the subsequent cultivation of the crop.

The present invention has for its principal object to produce a planter of simple and efficient construction whereby the cotton seed will be planted in hills at suitable intervals, the distance between the hills being capable of being accurately gaged and regulated.

A further object of the invention is to provide simple and improved means whereby the quantity of seed planted in each hill may be accurately gaged.

A still further object of the invention is to produce a cotton seed planter which will be simple in construction and thoroughly efficient in operation.

With these and other ends in view which will readily appear as the nature of the invention is better understood, the same consists in the improved construction and novel arrangement and combination of parts which will be hereinafter fully described and particularly pointed out in the claims.

In the accompanying drawings has been illustrated a simple and preferred form of the invention, it being, however, understood that no limitation is necessarily made to the precise structural details therein exhibited, but that changes, alterations and modifications within the scope of the claims may be resorted to when desired.

Figure 1:
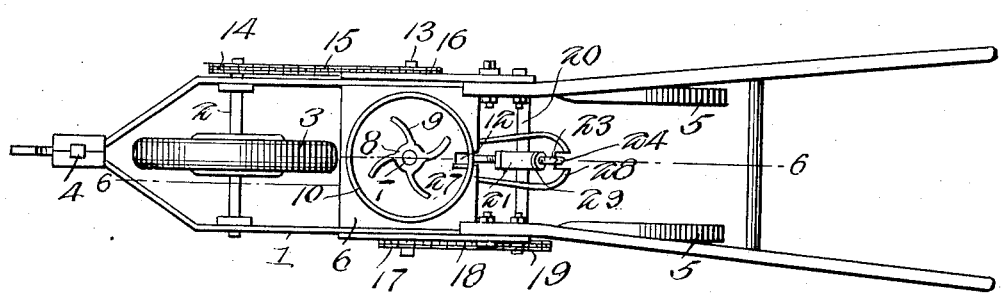
Figure 2:
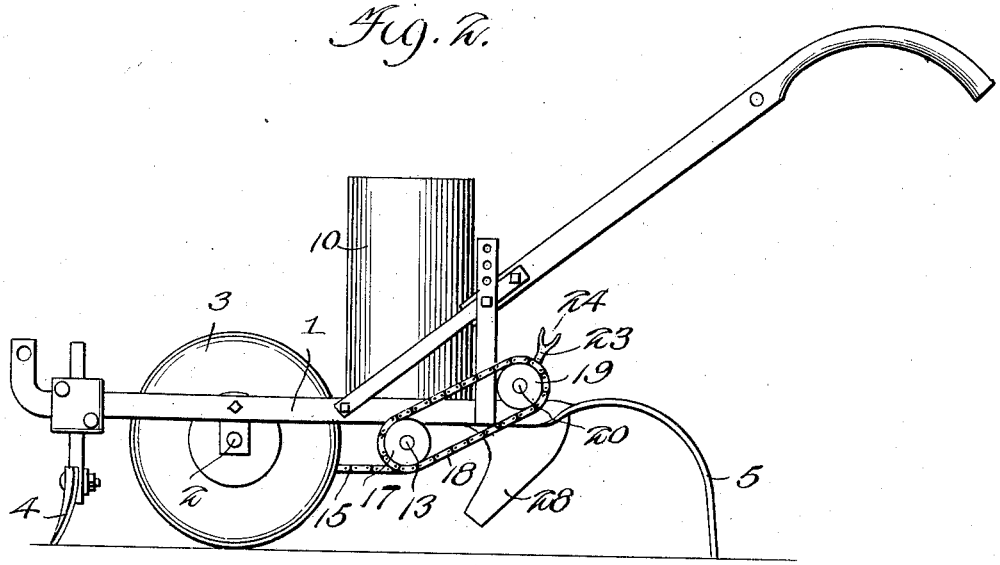
Figure 3:
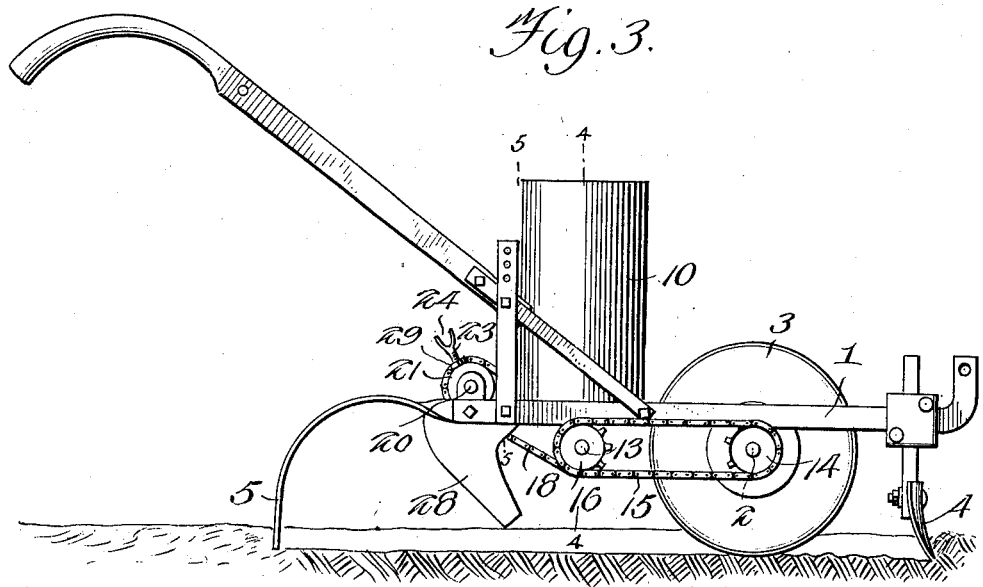
Figure 6:
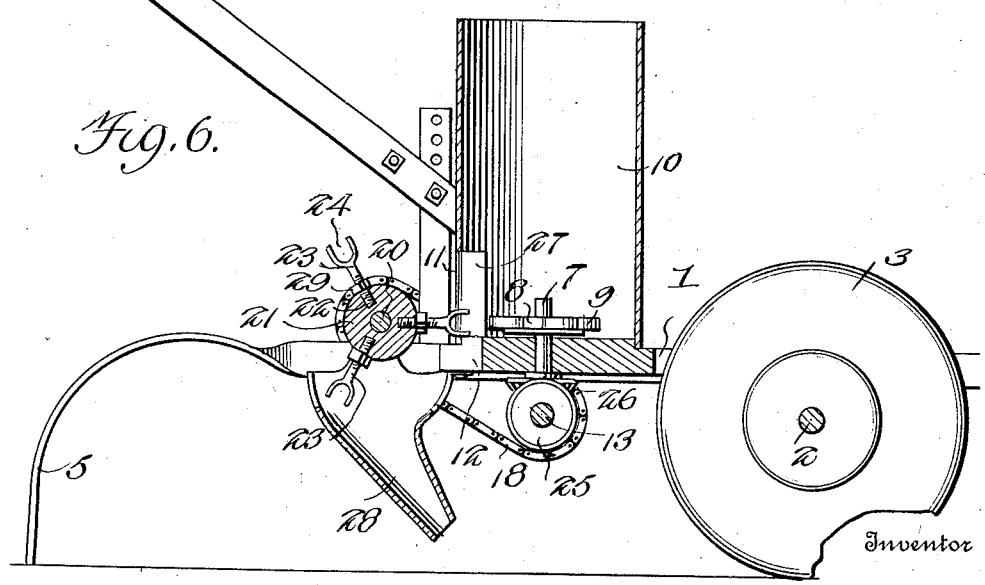

In the drawings,—Figure 1 is a top plan view of a cotton planter constructed in accordance with the invention. Fig. 2 is a side elevation of the same. Fig. 3 is a side elevation of the machine as seen from the opposite side. Fig. 4 is a vertical transverse sectional view taken on the line 4—4 in Fig. 3. Fig. 5 is a transverse sectional view taken on the line 5—5 in Fig. 3. Fig. 6 is a longitudinal sectional view taken on the line 6—6 in Fig. 1. Fig. 7 is a perspective detail view of a portion of the seed dropping mechanism, enlarged.

Corresponding parts in the several figures are denoted by like characters of reference.

The frame 1 of the improved seed planter is provided with bearings for a shaft or axle 2 carrying a supporting wheel 3. A furrow opener 4 is arranged a suitable distance in advance of the supporting wheel, and the side bars of the frame are provided at their rear ends with covering blades 5. Supported between the side bars of the frame a suitable distance in rear of the supporting wheel is a platform 6 having a bearing for a vertical shaft or spindle 7 carrying a hub 8 provided with a suitable number of radially extending arcuate fingers 9. The platform 6 supports a cylindrical hopper 10 which may be secured in any suitable manner. Said hopper is provided adjacent to its lower edge with a slit or aperture 11 registering with a slit or aperture 12 in the rear portion of the platform 6.

The frame is provided with bearings for a transverse shaft 13 located in rear of and in parallel relation to the shaft or axle 2, which latter is equipped with a sprocket wheel 14 connected by a chain 15 with a sprocket wheel 16 upon one end of the shaft 13 to which motion may thus be transmitted. The opposite end of the shaft 13 carries a sprocket wheel 17 which is connected by a chain 18 with a sprocket wheel 19 upon a shaft 20 which is supported for rotation transversely in rear of the hopper. The shaft 20 carries a hub 21 which is provided with a circumferential series of radially disposed sockets or recesses 22, said sockets or recesses being internally threaded for the reception of fingers 23, the outer extremities of which are bifurcated, as shown at 24, said fingers being adapted to operate through the slots 11, 12 in the hopper 10 and the platform 6, respectively.

The shaft 13 carries a bevel pinion 25 meshing with a bevel pinion 26 upon the lower end of the shaft 7 which is thereby rotated, causing the arcuate fingers 9 projecting from the hub 8 to rotate the contents of the cylindrical hopper 10, and also to force the lower portion of said contents outwardly in the direction of the wall of said cylindrical box or hopper. The latter is provided adjacent to the slot 11 with a vertically disposed flange 27 serving to intercept the seeds so that the seeds massed adjacent to said flange will be infallibly engaged by one of the bifurcated fingers 23 as the shaft 20 rotates, thus causing a charge of seeds to be projected downwardly through the slot 12 in the bottom platform 6. A seed spout or chute 28 is preferably supported adjacent to said slot for the purpose of guiding the seed to the furrow that is opened by the furrow opener 4 and in which the soil is packed by the supporting wheel 3, the seed being covered by the covering blades 5.

From the foregoing description, taken in connection with the drawings hereto annexed, the operation and advantages of this invention will be readily understood by those skilled in the art to which it appertains. It is well known that owing to the peculiar nature of cotton seed, difficulty has been experienced in separating the seeds to form a suitable charge for planting in a hill. By the present invention the seed contained in the cylindrical box or hopper is constantly rotated by the action of the arcuate fingers 9, which latter also serve to force the lowermost portion of the contents outwardly against the wall of the hopper, the seed being massed against the flange 27 adjacent to the slot 11. By providing the fingers 23 with bifurcated ends, as shown at 24, each of said fingers will infallibly engage and remove a charge of seed, the seeds being massed and compacted between the arms forming the bifurcation, as will be readily understood. It will also be seen that the arms forming the bifurcated end of each finger will practically form side walls of a measuring compartment, another wall of which is formed by the obstructing flange 27, while one of the arcuate fingers 9 may be regarded as constituting still another wall of such compartment which is of a proper size to receive a charge of seed, said charge being segregated from the mass or bulk contained in the hopper by the rotary movement of the member carrying the bifurcated fingers 23. It will also be understood that by adjusting the fingers 23 in the screw threaded recesses or sockets 22, the length of the portions of said fingers projecting from the hub 21 may be regulated, and in this manner the size of the charge may be governed. To secure the fingers 23 in adjusted position, the said fingers are provided with jam nuts 29.

It will be seen that the improved cotton planter is extremely simple in construction, and it has been found to be thoroughly practical and efficient in operation. The seed will be planted by this device with perfect regularity and uniformity. The distance between the hills may be governed by properly spacing the fingers 23 in the hub 21, it being understood that said hub may be provided with any desired number of fingers from one and upward.

Having thus described the invention, what is claimed as new, is:—

1. In a cotton seed planter, a platform, a cylindrical hopper supported thereon, a shaft supported for rotation axially with reference to the hopper and having outwardly extending arcuate fingers associated therewith, said hopper and platform being provided with registering slots, and said hopper being also provided with a vertically disposed obstructing flange adjacent to said slot, and a member supported for rotation and guided through the slots.

2. In a cotton seed planter, a platform, a cylindrical hopper supported thereon, a shaft supported for rotation axially with reference to the hopper and having outwardly extending arcuate fingers associated therewith, said hopper platform being provided with registering slots, and said hopper being also provided with a vertically disposed obstructing flange adjacent to said slot, and a member supported for rotation and having a bifurcated end guided through the slots and coöperating with the obstructing flange and with the arcuate fingers to form a compartment for the reception of a charge of seed.

3. In a cotton seed planter, a platform, a hopper supported thereon, said hopper and platform being provided with registering slots, means for rotating the contents of the hopper and for impelling a portion of said contents in the direction of the slots, a vertically disposed obstructing flange adjacent to the slot, a transverse shaft supported for rotation adjacent to the slots, a hub upon said shaft having a threaded socket, a finger engaging said threaded socket and having a bifurcated outer end guided through the slots, and a jam nut upon said finger whereby it may be secured in adjusted position.

4. In a cotton seed planter, a cylindrical receptacle constituting a hopper, said receptacle being provided with a slot, a vertically disposed obstructing flange adjacent to said slot, agitating means within the receptacle including arcuate fingers operating to maintain the bulk of the contents in a state of rotation and to force a portion of said contents outwardly in the direction of the slot, and a movably supported bifurcated member guided through the slot and operating to expel a portion of the contents through said slot, said bifurcated member coöperating with the vertically disposed obstructing flange and with the arcuate arms to form a compartment to hold a charge of seed.

5. In a cotton seed planter, a cylindrical receptacle constituting a hopper, said receptacle being provided with a slot, an obstructing flange adjacent to said slot, agitating means within the receptacle comprising arcuate arms operating to maintain the bulk of the contents in a state of rotation and to force a portion of said contents outwardly in the direction of the slot, and a movably supported bifurcated member guided through the slot and operating to expel a portion of the contents through said slot, said bifurcated member being adjustable with reference to the hopper to regulate the extent to which it will project within the hopper, and said bifurcated member coöperating with the obstructing flange and with the arcuate arms to form a compartment for the reception of a charge of seed.

In testimony whereof I affix my signature in presence of two witnesses.

WILLIAM F. COVINGTON.

Witnesses:
J. J. ESPEY,
BROOKS HORACE.

Copies of this patent may be obtained for five cents each, by addressing the "Commissioner of Patents, Washington, D. C."